(No Model.)
M. J. SHIMER.
MANUFACTURE OF SAD IRONS.
No. 284,249. Patented Sept. 4, 1883.
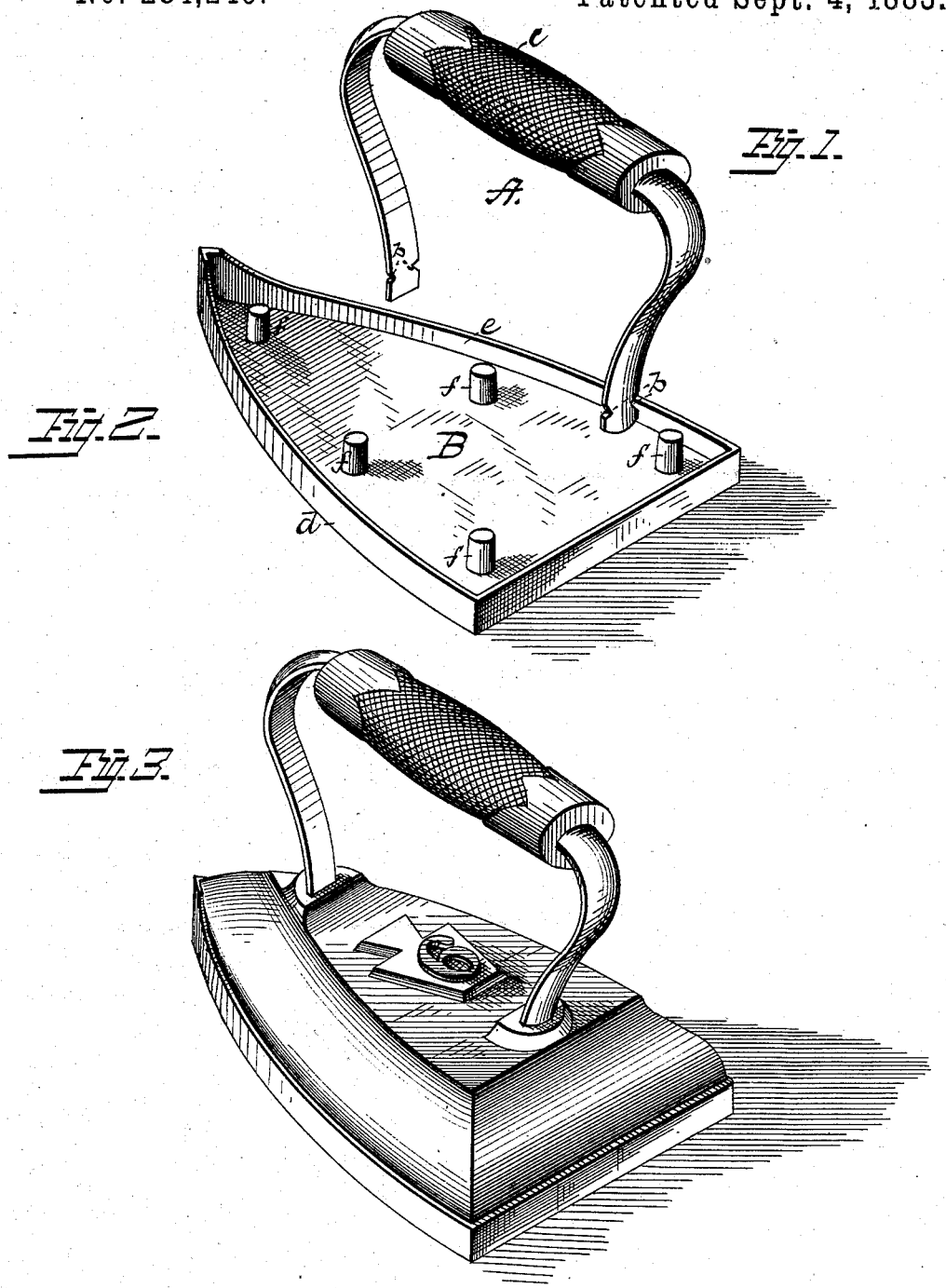
WITNESSES
Franck L. Ourand
INVENTOR
M. J. Shimer,
by Heylmun & Kaus.
Attorneys.
N. PETERS. Photo-Lithographer. Washington, D. C.

UNITED STATES PATENT OFFICE.

MILTON J. SHIMER, OF FREEMANSBURG, PENNSYLVANIA.

MANUFACTURE OF SAD-IRONS.

SPECIFICATION forming part of Letters Patent No. 284,249, dated September 4, 1883.

Application filed December 11, 1882. (No model.)

*To all whom it may concern:*

Be it known that I, MILTON J. SHIMER, a citizen of the United States of America, residing at Freemansburg, in the county of Northampton and State of Pennsylvania, have invented certain new and useful Improvements in the Manufacture of Sad-Irons; and I do hereby declare the following to be a full, clear, and exact description of the invention, such as will enable others skilled in the art to which it appertains to make and use the same.

This invention relates to the manufacture of sad-irons; and it has for its object to make different parts of the sad-iron of different qualities of iron, whereby a substantial and cheap sad-iron is provided for the trade.

My invention consists in the construction and combination of parts, as will be hereinafter more fully set forth, and pointed out in the claim.

In the annexed drawings, forming a part of this specification, Figure 1 is a perspective view of the handle. Fig. 2 is a perspective view of the bottom plate for a sad-iron, and Fig. 3 is a perspective view of the improved sad-iron.

In the manufacture of these sad-irons suitable molds are employed, preference being made to that class shown and described in my application for Letters Patent filed in the United States Patent Office on or about the 19th day of October, 1882, Serial No. 74,645, and patented December 12, 1882, No. 268,948.

In carrying out the manufacture of the sad-iron a bar of wrought-iron of a plano-convex shape in cross-section is passed through a power-machine, which divides the bar into desired lengths to serve the purpose of handles for sad-irons. During the operation of dividing the bar into lengths, side notches, *b*, are formed at the ends of the divided sections, as shown. These sections are placed in suitable shaping means and bent into the desired shape for handles. These now-shaped bar-sections are placed in molds, and molten cast-iron run in to form the grasping portion *c* of the handle A, as shown. The bottom plate, B, (see Fig. 2,) which should be made of a good quality of iron, is cast in a separate mold. This bottom plate consists of the base *d*, upward-surrounding flange *e*, and the studs *f*, suitably arranged to make a good and firm connection with the body of the sad-iron about to be described. This prepared bottom plate, B, is placed in the mold, and the ends of the prepared handle arranged in the mold so that the ends shall, or nearly, touch the bottom plate, and the mold closed to receive the molten metal. Reference for a further description of the mold and the arrangement of the plate therein is made to the patent hereinbefore referred to. The molten cast-iron employed for the body of the sad-iron, which is an inferior quality, is run into the mold and forms a union with the bottom plate and handles. The studs of the bottom plate and the side notches of the handle form good anchoring means for these members with the body of the iron. The bottom of the sad-iron is polished and finished in the usual manner for the market.

A sad-iron manufactured according to my method can be produced at a small cost for the trade, and has all or nearly all the advantages of the most expensive ones.

What I claim as my invention, and desire to secure by Letters Patent, is—

As an improved article of manufacture, the sad-iron composed of the handle, the bottom, made of a fine quality of cast-iron capable of receiving a polish, and the body, made of an inferior quality of cast-iron, said parts being solidly united together as one casting, substantially as described.

In testimony whereof I affix my signature in presence of two witnesses.

M. J. SHIMER.

Witnesses:
IRVIN H. SHIMER,
FR. M. RAUCH.